United States Patent [19]

Buck

[11] Patent Number: 4,709,603
[45] Date of Patent: Dec. 1, 1987

[54] ADJUSTABLE SIDEWARDLY LOCATED BAR PULLER

[76] Inventor: James R. Buck, 1207 SE. 10th St., Cape Coral, Fla. 33904

[21] Appl. No.: 893,413

[22] Filed: Aug. 5, 1986

[51] Int. Cl.[4] .................. B23B 13/02; B23B 13/12
[52] U.S. Cl. ................................. 82/2.5; 82/39; 414/14
[58] Field of Search .............. 82/2.5, 2.7, 38 R, 39; 51/238 R, 238 S; 414/14–20

[56] References Cited

U.S. PATENT DOCUMENTS

| | | | |
|---|---|---|---|
| 477,513 | 6/1892 | Conradson | 414/14 |
| 489,935 | 1/1893 | Conradson | 414/14 |
| 932,394 | 8/1909 | Johnson | 414/14 |
| 1,523,959 | 1/1925 | Hanson | 82/39 |
| 4,321,845 | 3/1982 | Szabo et al. | 82/2.5 |
| 4,404,878 | 9/1983 | Blanchard et al. | 82/2.5 |
| 4,464,958 | 8/1984 | Luks | 82/2.5 |
| 4,522,091 | 6/1985 | Toffolon | 82/2.5 |
| 4,580,470 | 4/1986 | Buck | 82/2.5 |
| 4,617,847 | 10/1986 | Schaldach | 82/2.5 |

Primary Examiner—Nicholas P. Godici
Assistant Examiner—Jerry Kearns
Attorney, Agent, or Firm—Flynn, Thiel, Boutell & Tanis

[57] ABSTRACT

A bar puller having a body which mounts a pair of rockers which project forwardly to effectively straddle a bar. The rockers mount rollers on the free ends thereof, the latter being provided with elastomeric surfaces to effect gripping of the bar. An adjusting mechanism coacts between the rearward free ends of the rockers to permit the minimum spacing between the rollers to be selectively adjusted to accommodate a selected bar size, and to permit the initial gripping pressure of the rollers on the bar to be selectively adjusted.

9 Claims, 4 Drawing Figures

ADJUSTABLE SIDEWARDLY LOCATED BAR PULLER

FIELD OF THE INVENTION

This invention relates to a sideward-located bar puller adapted to be mounted on a machine tool and, in particular, to an improved bar puller capable of adjustment both with respect to gripping size and pressure.

BACKGROUND OF THE INVENTION

My U.S. Pat. No. 4,580,470 illustrates a bar puller which mounts on a machine tool, such as a lathe, with the bar puller having a pair of forwardly projecting levers which move forwardly to effectively straddle and grippingly engage a bar mounted on the lathe so as to permit advancing thereof. This bar puller is highly desirable in view of its ability to grippingly engage and advance the workpiece without requiring any other disassembly of any other structure or components, and in addition permits engagement of a bar which projects only a small distance beyond its support or collet.

This invention relates to improvements in a bar puller of the type described in my aforementioned patent, and in particular significantly improves the operational and advantageous characteristics of such bar puller.

More specifically, this invention relates to an improved bar puller of the type disclosed in my aforementioned '470 patent, but which in addition permits the spacing between the gripping rollers on the levers to be selectively adjusted over a significantly wide range so that the bar puller is usable with a wide range of bar diameters. In addition, this improved bar puller can, after having been adjusted to the desired bar diameter, be suitably adjusted so as to select the optimum gripping pressure when the rollers engage the bar.

The improved bar puller of this invention, as aforesaid, in addition possesses a structure which is economical to manufacture and assemble, and is easy and simple to adjust.

Other objects and purposes will be apparent to persons familiar with structures of this general type upon reading the following specification and inspecting the accompanying drawings.

Figure 2:
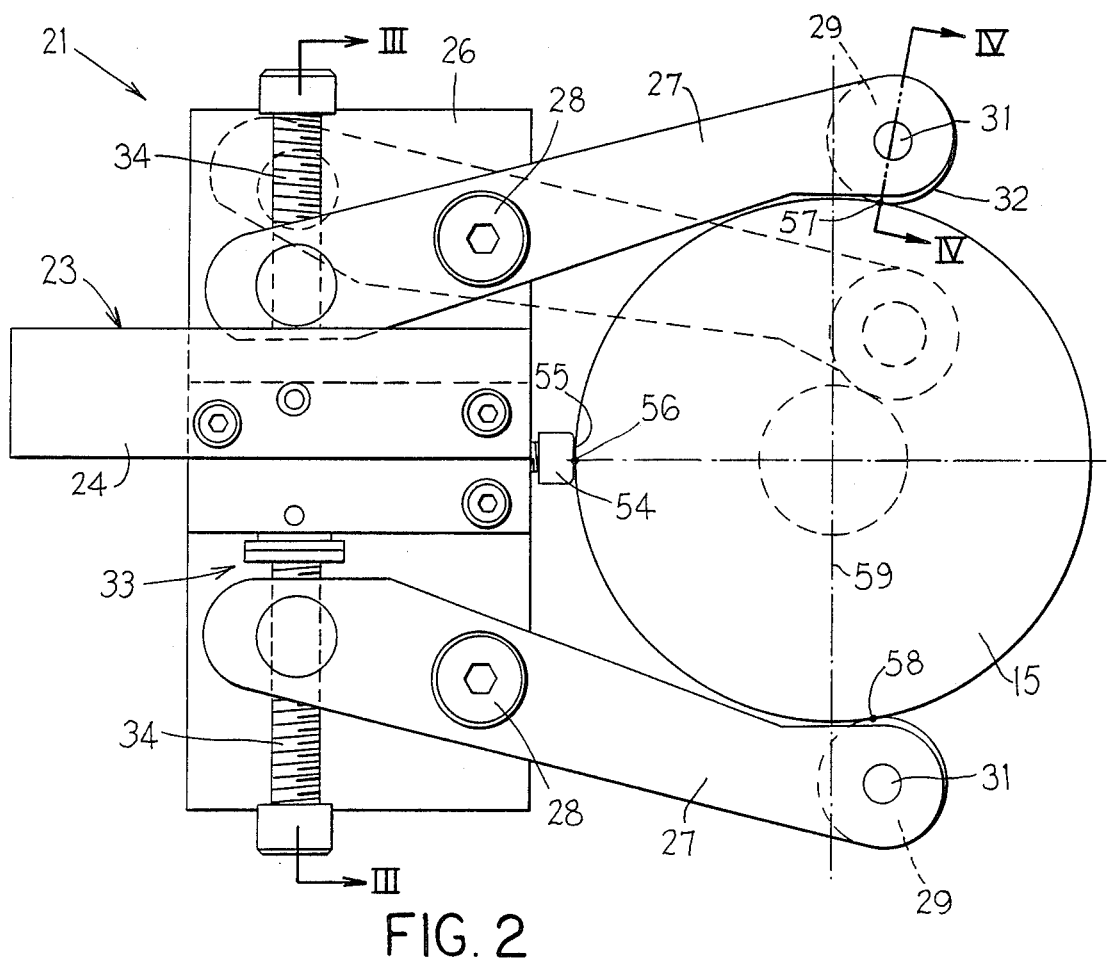
FIG. 2 is an enlarged view of the improved bar puller showing it in engagement with a workpiece or bar.

The words "front" and "forward" will have reference to the end of the bar puller appearing on the right side of FIG. 2, and movement thereof in a direction toward the bar. The words "inwardly" and "outwardly" will refer to directions toward and away from the geometric center of the device and designated parts thereof. Said terminology will include the words specifically mentioned, derivatives thereof, and words of similar import.

DETAILED DESCRIPTION

Figure 1:
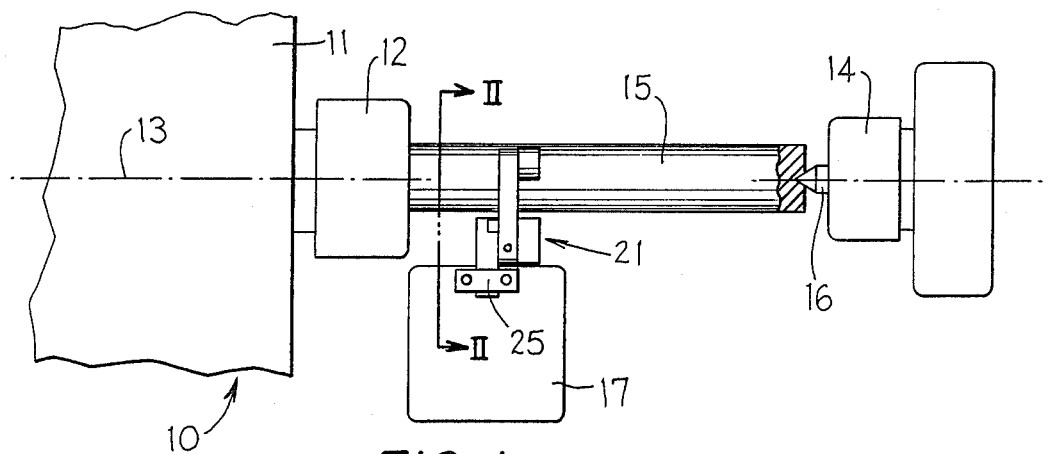
FIG. 1 is a diagrammatic, fragmentary illustration of a turret lathe having a bar puller according to the present invention mounted thereon.
Figure 3:
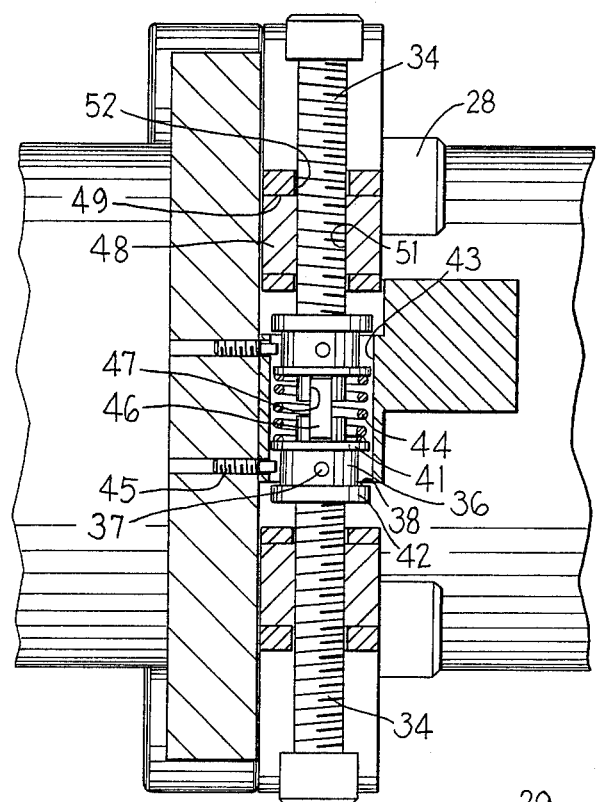
FIG. 3 is a sectional view as taken substantially along line III—III in FIG. 2.
Figure 4:
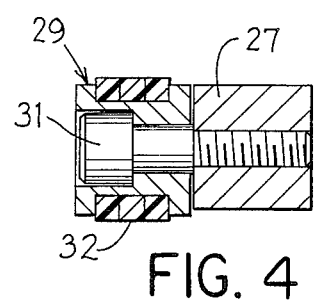
FIG. 4 is a sectional view as taken along line IV—IV in FIG. 2.

The improved bar puller of this invention, as illustrated in greater detail in FIGS. 2 and 3, is intended for mounting on a machine tool, such as a turret lathe 10 as diagrammatically illustrated in FIG. 1.

The lathe 10 includes a housing 11 on which a rotatable headstock 12 is mounted, which headstock has a conventional chuck or collet which is rotatable about the axis 13. The headstock is designed for gripping engagement with an elongate workpiece such as a bar or rod 15 which extends through and projects outwardly from the headstock so as to permit selected machine operations to be carried out thereon. The lathe 10, in the illustrated embodiment, may also include a tailstock 14 provided with a center 16 which is adapted for supportive engagement with the exposed end of the bar 15 when machining on long sections of the workpiece is desired. Lathe 10 also conventionally has a tool support 17 which is adapted to have a cutting tool mounted thereon, the tool support 17 being supported for movement radially toward and away from the bar 15 and axially therealong, so as to permit the desired machine operations to be performed. The structure of the lathe 10 is conventional so that further detailed description and illustration thereof is believed unnecessary.

To effect pulling of the bar 15 axially outwardly from the headstock 12, the lathe can be provided with the bar puller 21 according to the present invention, which bar puller is mounted on the tool support 17 as diagrammatically illustrated in FIG. 1.

The bar puller 21, as illustrated in FIGS. 2 and 3, includes a main body 23 which has a stem part 24 for permitting attachment of the puller to the tool support 17, such as by means of a clamp 25. The stem part 24 of body 23 terminates in a transversely extending head part 26, which head part normally is oriented so as to extend vertically in perpendicular relationship to the longitudinal axis of the bar 15. This head part 26 mounts thereon, adjacent the opposite ends thereof, a pair of levers or rockers 27, the latter being pivotally supported on the head part 26 at a location intermediate the length of the rockers by means of pivot shafts or bolts 28. Each rocker 27 projects forwardly a substantial distance beyond the head part 26 and has a roller 29 rotatably supported thereon by a pivot bolt or shaft 31. The roller 29 is preferably provided with a coating or tread 32 of elastomeric material around the cylindrical peripheral surface thereof. This coating 32 is normally rather thin, such as in the neighborhood of 3/16 inch thick, and is preferably of polyurethane.

Rockers 27 have the rearward ends thereof projecting rearwardly from the pivots 28, which rearward ends cooperate with adjustment means 33. This adjustment means 33 permits both the gripping width (i.e., diameter) and gripping pressure to be selectively adjusted.

The adjusting means 33 includes a pair of threaded adjusting rods or screws 34 which are disposed in opposed aligned relationship, the screws projecting upwardly and downwardly in opposite directions relative to the body 23. These screws 34 are both externally threaded, and the threads are of opposite hand. For example, the upper screw 34 has a right-hand thread, and the lower screw 34 has a left-hand thread.

Each of the screws 34 has a stop ring 36 fixed thereon at the inner end thereof. For example, each screw 34 and its associated stop ring 36 is fixedly and nonrotatably secured together by means of a transverse lock pin 37.

The stop ring 36 is of a generally spool-shaped configuration in that it has an annular groove 38 formed in and extending around the exterior periphery thereof, this groove 38 being of substantial axial extent and bounded by annular end flanges 41 and 42 which project radially of the stop ring. The pair of stop rings 36 are substantially axially aligned with one another and are axially slidably accommodated within a bore 43 which extends transversely (here vertically) of the body 23. The bore 43 is oversized relative to stop rings 36 to permit limited sideward displacement of the latter rings. The axis of this bore 43 extends perpendicular to the axes of the pivots 28. The bore 43 accommodates a resilient biasing means 44 therein, such as a helical compression spring in the illustrated embodiment or a stack of Belleville spring washers, the latter acting against the opposed inner ends of the stop rings 36 so that the rings 36 are urged axially outwardly of the bore 43.

To limit the outward extension of the stop rings 36 due to the urging of the spring 44, a stop member 45 is mounted on the body for cooperation with each of the stop rings. This stop member 45, in the illustrated embodiment, comprises a threaded stop member which has the inner end thereof projecting radially into the bore 43 so as to be accommodated within the annular groove 38 of the respective stop ring 36. In this manner, the stop member 45 abuts against the inner annular flange 41 and thus limits the outward extension thereof due to the urging of the spring. Since the groove 38 is axially enlaraged relative to the stop member 45, as illustrated by FIG. 3, this hence enables the adjustment screw to have limited floating movement in its axial direction so as to permit the adjustment screws and the levers to undergo a limited lateral shift, such as if the bar 15 is not properly aligned with the opening or spacing between the rollers 32.

The pair of axially aligned adjusting screws 34 are also coupled together for simultaneous rotation. For this purpose a platelike coupler member 46 is disposed within the bore 43 between the inner ends of the adjusting screws 34. This coupler 46 has the opposite ends thereof slidably projecting into slots 47 which open axially inwardly of the inner ends of the adjusting screws 34. The coupler 46 ensures that the pair of adjustment screws 34 synchronously rotate in the same direction, but at the same time this coupler and its axial slidable cooperation within the slots 47 permits the pair of adjusting screws 34 to simultaneously and identically move axially either inwardly or outwardly relative to one another and relative to the body 23, depending on the direction of rotation.

To couple the adjusting means 33 to the rearward ends of the rockers 27, each adjustment screw 34 is threadably engaged with a nut 48. This nut 48 is formed substantially as a cylindrical body, which body is rotatably disposed within a bore 49 which is formed in and extends transversely through the rearward end of the rocker 27. The axis of this bore 49 hence extends parallel with the pivot shaft 28. The nut 48 has a threaded bore 51 extending radially thereacross for threadably accommodating the respective adjusting screw 34. This bore 51, at opposite ends thereof, communicates with elongated slots 52 which extend through the sidewalls of the rocker 27 so as to permit the adjusting screw to project therethrough while permitting relative pivoting therebetween.

Due to the outward urging of the spring 44 and its tendency to urge the rearward ends of the rockers 27 outwardly away from one another, this continuously biases the rollers 31 inwardly toward one another, with the inward swinging movement of the rollers being limited by the engagement of the stop rings 36 with the stops 45. The position of the stop rings 36 is hence adjusted, by suitable rotation of the adjusting screws 34, so that when the bar puller is disengaged from the bar 15, the spring 44 will urge the rockers 27 inwardly into a position wherein the normal minimum separation between the rollers 31 as limited by the stop rings 36 is slightly less than the diameter of the bar 15.

The bar puller also mounts thereon a movable stop pin 54, which pin has a transverse end surface 55 which is adapted for contact with the bar 15. This stop pin 54 projects in a direction radially toward the bar 15 and threads into a bore formed in the body 23 so as to be adjustable in a direction toward the bar 15. This stop pin 54 is adapted to contact the periphery of the bar at a location 56 disposed midway between the points of contact 57 58 created by the rollers 31.

OPERATION

While operation of the bar puller 21 according to this invention is believed apparent from the description given above, nevertheless same will be briefly described to ensure a complete understanding thereof.

When a bar 15 is to be advanced through the headstock 12 for engagement with the center 16 of the tailstock 14, the tool support 17 is moved radially inwardly toward the bar 15. This causes the rollers 31 to rollingly engage the bar 15 and hence swing outwardly away from one another in opposition to the urging of the spring 44. The tool support 17 is preferably moved inwardly until the guide pin 54 contacts the side of the bar 15 substantially at the contact point 56. At this time, the rollers 31 have rolled partially around the bar so that the treads 32 on the rollers hence contact the bar 15 at two additional spaced contact points 57 and 58, the latter preferably being slightly past the vertical central plane 59 of the bar. The rollers 31 and the guide pin 54 hence define a three-point triangular engagement with the bar 15. In addition, since the treads 32 on the rollers 31 are of an elastomeric material, such as polyurethane, the rollers hence do not mark or damage the surface of the bar, and at the same time create a good gripping engagement with the bar. Thereafter, the tool support 17 is moved axially, carrying with it the bar puller 21, and hence causing the bar 15 to be moved axially forwardly until the free end thereof engages the center 16. Tool support 17 is then moved radially outwardly, whereupon the rockers 27 are withdrawn so that the rollers 31 rollingly move around the bar and are then moved radially away from the bar out of engagement therewith.

When one wishes to initially adjust the grip or width between the rollers 31 so as to accommodate a selected bar size or diameter, then a tool is applied to the head of one of the screws 34 so as to effect simultaneous rotation of the screws. This causes simultaneous movement of the stop rings 36 in opposite directions, and causes swinging of the rockers 27 so as to vary the width or spacing between the rollers 31. This adjusting motion continues until the spacing between the rollers 31 equals the diameter of the selected bar. Thereafter, the adjusting screws 34 are rotated a small additional amount, such as one to two additional revolutions, in the direction which tends to move the stop rings 36 outwardly since this causes the rockers 27 to swing inwardly so that the minimal spacing between the rollers 31 is slightly smaller than the diameter of the bar 15. The spring 44 will hence maintain the rollers in this innermost minimal-spacing position. When the bar puller is then moved sidewardly so that the rollers 31 engage the bar 15, the bar will force the rollers and their rockers slightly outwardly against the urging of the spring, whereupon the urging of the spring 44 coupled with the elasticity of the tread 32 will effect gripping of the bar 15.

At the same time, this adjusting means 33 can also be used for adjusting the gripping pressure which the rollers 31 apply to the bar 15. With a slight inward movement of the rollers 31 toward one another, the minimal spacing between the rollers will be only slightly smaller than the bar diameter, and hence the gripping pressure of the rollers when engaged with the bar will be a minimal amount. However, if the rotation of the adjusting screws is of a greater amount so that the rollers 31 are moved inwardly a greater extent from the initial set position, whereby the minimal spacing between the rollers 32 is a lesser amount and hence has a greater radial differential relative to the bar diameter, the rollers 31 will have to be deflected radially outwardly through a greater distance when engaging the bar, and will cause greater compression of the spring and thus will exert a greater gripping pressure on the bar.

When working with a bar 15 of larger diameter, such as in the order of a four-inch diameter, use of the spring 44 is highly desired, together with the third contact point created by the stop 54. When the device is used with smaller diameter bars, however, such as bars in the range of 1½ inch to 2½ inch, then in such instances it has been observed that the device can be made to operate successfully without the spring 44 inasmuch as sufficient resiliency and elasticity can be provided solely due to the elastomeric treads 32 on the rollers 31. In this latter use situation, the spring 44 can be eliminated if desired, although even in such usage the spring 44 is preferably provided. In addition, when dealing with very small diameter bars such as in the order of one inch, the third contact point created by the stop 54 is not required and hence such stop can be eliminated.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A bar puller for use with a machine tool for engaging and pulling on a bar for advancing the latter axially of the machine tool, said bar puller comprising:
    a support body adapted for securement to the machine tool;
    first and second levers pivotally supported on said body for swinging movement about subsstantially parallel axes, said levers projecting outwardly from said body substantially beyond said axes so that the levers project generally in the same direction, said levers projecting outwardly and terminating in free ends;
    a roller rotatably supported on each of said levers adjacent the free ends thereof, each said roller being supported for rotation about an axis which is substantially parallel to the pivot axis;
    stop means mounted on said body for cooperating with said first and second levers for limiting the inward swinging of the levers and the rollers thereon toward one another for defining a minimal spacing between said rollers which is less than the diameter of said bar;
    manually actuable adjusting means for adjusting the position of said stoop means relative to said body to selectively adjust the magnitude of said minimal spacing between said rollers;
    said stop means incuding a pair of stop members movably supported on said body, spring means coacting between said stop members and normalaly urging them outwardly in opposite direction, and a pair of stops fixed to said body, said spring means normally maintaining said stop members in engagement with said stops; and
    said adjusting means including threaded adjusting members coacting with said stop members and being threadably engaged with said levers so that rotation of said threaded adjusting members causes the position of said stop members to be adjusted relatve to said levers so as to vary said minimal spacing between said rollers.

2. A bar puller according to claim 1, wherein each said adjusting member is threadably engaged with a respective said lever and is axially coupled with a said stop member, said body having a bore therein extending substantially perpendicularly with respect to said axes, said stop members being movably disposed within said bore adjacent opposite ends thereeof with said spring means being disposed between said stop members, said adjusting members projecting outwardly in opposite directions from said stop members for threaded engagement with said levers.

3. A bar puller according to claim 1, wherein said adjusting means includes a pair of said threaded adjusting members which are rotatably coupled together and rotatably supported on said body, said pair of threaded adjusting members being oppositely threaded and each being threadably engaged wit a respective said lever.

4. A bar pulleer according to claim 1, wherein each said roller has a thread of an elastromeric material extending therearound.

5. A bar puller for use with a machine tool for engaging and pulling on a bar for advancing the latater axially of the machine tool, said bar puller comprising:
    a support body adapted for securement to the machine tool;
    first and second levers pivotally supported on said body for swinging movement about substantially parallel axes, said levers projecting outwardly from said body substantially beyond said axes so that the levers project generally in the same direction, said levers projecting outwardly and terminating in free ends;
    a roller rotatably supported on each of said levers adjacent the free end therreof, each said roller being supported for rotation about an axis which is substantially parallel to the pivot axis;
    manually actuable adjusting means cooperating with said first and second levers for adjusting the magnitude of a minimal spacing between said rollers;
    said adjusting means including elongated rod means rotatably supported on said body and extending in generally perpendicular relationship relative to said axes;

said adjusting means also incuding first and second threaded coupling means connected between said rod means and said first and second levers respectively, said first and second threaded coupling means being threadably engaged with said rod means and having threads which are of opposite hand so that rotation of said rod means causes the levers to be pivotally displaced in opposite directions about their respective axes; and stop means coopoerating between said body and said rod means for permitting limited axial displacement of said rod means relative to said body.

6. A bar puller according to claim 5, wherein each said roller has a tread of an elastomeric material extending therearound.

7. A bar puller according to claim 6, wherein each said threaded coupling means includes a nut member which is threadably engaged wit said rod means and is carried by the respective said lever.

8. A bar puller according to claim 7, wherein each said nut is pivotally supported on its respective said lever for pivoting about an axis which is generally parallel with but spaced transversely from the axis which pivotally supports the lever.

9. A bar puller according to claim 5, wherein said adjusting means includes spring means for continually urging the levers toward a rest position wherein the spacing between the rollers is slightly less than the diameter of a bar which is to be engaged by the rollers.

* * * * *